UNITED STATES PATENT OFFICE.

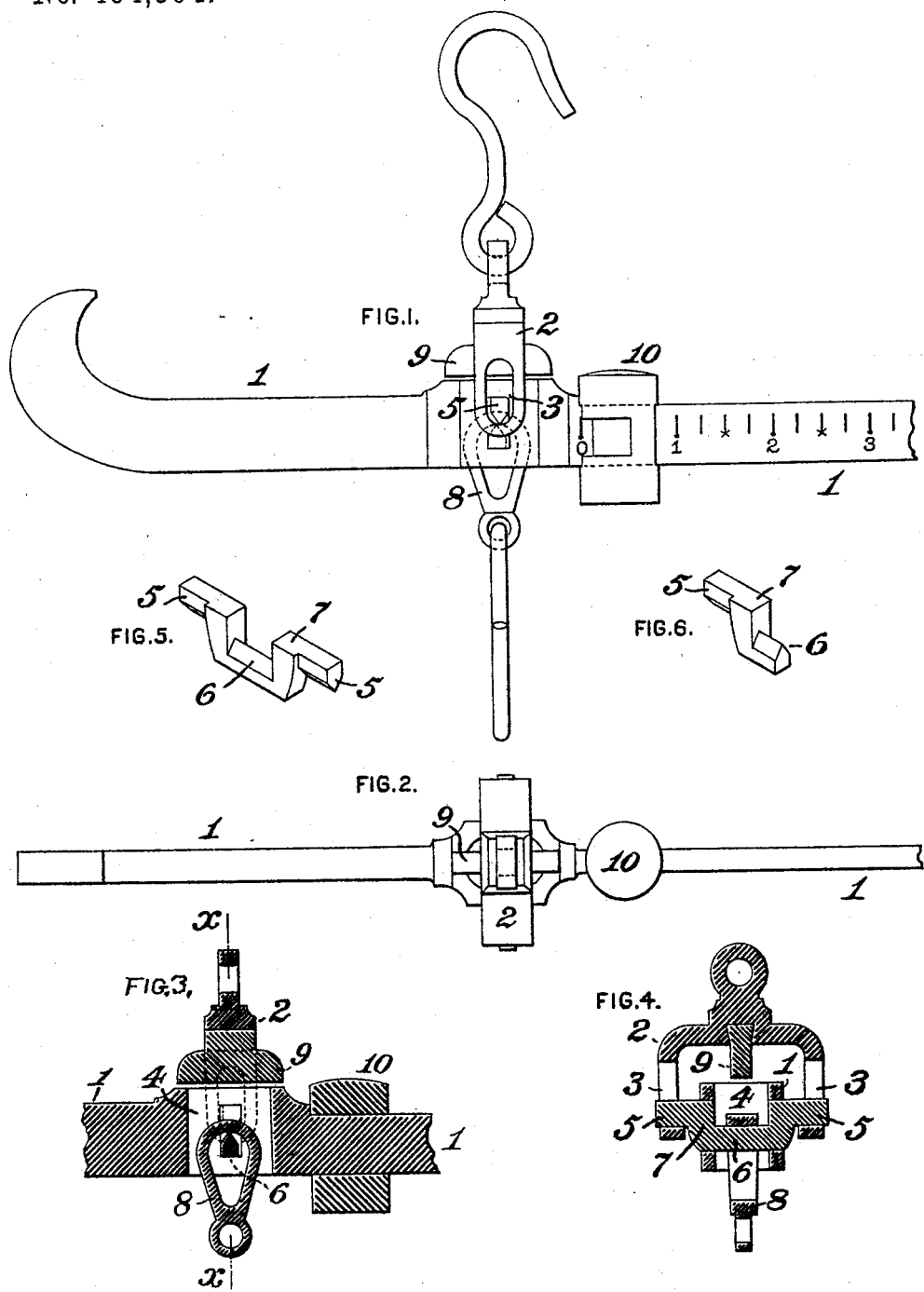

HENRY G. BEUCKMANN, OF YOUNGSTOWN, OHIO.

WEIGHING-BEAM.

SPECIFICATION forming part of Letters Patent No. 454,394, dated June 16, 1891.

Application filed November 4, 1890. Serial No. 370,286. (No model.)

*To all whom it may concern:*

Be it known that I, HENRY G. BEUCKMANN, of Youngstown, in the county of Mahoning and State of Ohio, have invented a certain new and useful Improvement in Weighing-Beams, of which improvement the following is a specification.

The object of my invention is to provide a simple and convenient stop for a weighing-beam when the load is applied, which will also serve as a balance-index.

To these ends my invention, generally stated, consists in the combination, with a weighing-beam, of a beam-stop fixed to a supporting-clevis at right angles to the central plane of the clevis-eyes and parallel to the face of the beam when in balance.

The improvement claimed is hereinafter fully set forth.

In the accompanying drawings, Figure 1 is a side view in elevation of a weighing-beam embodying my invention; Fig. 2, a plan or top view of the same; Fig. 3, a longitudinal central section at and near the pivots; Fig. 4, a transverse section at the line $x\ x$ of Fig. 3; Fig. 5, an isometrical view of the pivot-block detached, and Fig. 6 a similar view illustrating a modified form of the same.

The construction of weighing apparatus adapted for use with loads of any considerable weight necessitates the employment of what are known as "multiplying beams"—that is to say, lever-beams having comparatively short resistance-arms and long weight-arms—in order to enable small and light weights to be used for balancing heavy loads or resistances. It will be obvious that the closer the fulcrum of the beam is placed to the pivot on which the load or resistance is suspended the greater will be the multiplication of the gravity of the weight which will be effected by the beam. The reduction of distance between the beam-fulcrum and the resistance-pivot being, in the ordinary construction, limited by the thickness of the suspending members of the beam and of the load, respectively, the employment of additional levers and pivots becomes necessary where an increase of multiplying effect above that due to the minimum distance attainable is required, thereby involving a corresponding complication of structure and increase in cost and liability to derangement.

My improvement is shown as applied in connection with a construction which enables the distance between the beam-fulcrum and resistance-pivot to be reduced to any required degree, thus increasing the power of the weight and reducing the length of the beam as well as effecting a material simplification of structure.

In the practice of my invention I provide a weighing-beam 1, which is of the same general form as those heretofore known in the art, and is adapted to be suspended from a suitable support by a clevis or U-shaped hanger 2, having an eye 3 in each of its lateral arms. A vertical slot or passage 4 is formed in the beam 1 for the reception of a pivot and suspending hanger which carry the load to be weighed, the width of said slot being such as may be necessary to accommodate a hanger of the proper strength. The fulcrum-pivots 5 and the load or resistance pivot 6 are preferably knife-edge bearings of the usual form with their edges located in the same horizontal plane, and in order that their vertical central planes (the distance between which is the length of the load or resistance arm of the beam) may be located as closely together as desired said pivots are made integral or in a single piece, being formed upon a pivot-block 7, which passes through the slot 4 and is fixed firmly in the metal of the beam on each side of said slot. The load-pivot 6, which constitutes the central portion of the pivot-block, is provided with a knife-edge on its top, which serves as a bearing for a hanger 8, from which the load to be weighed is suspended. The fulcrum-pivots 5, which project from the pivot-block at each side of the beam, are knife-edged on their lower sides in line with the knife-edge of the load-pivot and bear in the eyes 3 of the clevis 2.

The modified form of pivot-block shown in Fig. 6 is adapted for application to weighing-beams having two lateral webs adjacent to the beam-pivots, which webs are located at a greater distance apart than the width of the slot 4 of the beam herein shown in order to impart greater lateral stability to the beam. In such cases each web may be provided with a pivot-block similar to that of Fig. 6, which is practically one-half of the pivot-block before described, the fulcrum-pivot 5 and resistance-pivot 6 being made integral and being in the same relative locations as in the former case.

The fulcrum-pivots and resistance-pivot are, by the construction above described, located in different longitudinal vertical planes as well as in different transverse vertical planes. The hangers or suspending members on which the fulcrum-pivots are carried and which the load-pivot carries, respectively, are consequently also located in different longitudinal vertical planes, and therefore may overlap longitudinally to any extent due to the longitudinal proximity of the central planes of the pivots. It will thus be seen that no limit is imposed upon the location of said central planes, and that, therefore, they may be located at an infinitesimally small distance apart, thus correspondingly increasing the leverage or multiplying action of the beam proportionately to any determined length of its longer or weight arm, or enabling a proportionate reduction of length of the weight-arm to be made for a determined multiplication, as the case may be. The weight-arm of the beam is marked with numbered division-lines for indicating the weight of the load and is provided with a sliding balance-weight 10 in the usual manner.

In order to prevent an undue degree of movement of the beam about its fulcrum upon the application and release of load, as well as to provide a suitable balance-index, a beam-stop 9 is secured centrally on the clevis 2 above and adjacent to the top of the beam. The lower face of the beam-stop is located at right angles to the vertical central plane of the clevis-eyes and parallel with the upper face of the beam when the latter is in perfect balance. Preponderance of weight upon either arm of the beam will elevate the opposite arm until the top of the beam comes in contact with the stop 9, which will arrest the further upward traverse of the arm, and the beam will be indicated to be in or out of balance by the parallelism or the relative angularity of the adjacent faces of the beam-stop and the beam, as the case may be.

I claim as my invention and desire to secure by Letters Patent—

The combination of a weighing-beam, lateral fulcrum-pivots fixed therein, a suspending clevis or hanger having eyes inclosing the fulcrum-pivots, and a beam-stop fixed to the clevis and having a face at right angles to the central plane of the clevis and parallel to the adjacent face of the beam when in balance, substantially as set forth.

HENRY G. BEUCKMANN.

Witnesses:
W. R. MERRICK,
FRANK STILES.